US008847462B2

(12) United States Patent
Filgertshofer

(10) Patent No.: US 8,847,462 B2
(45) Date of Patent: Sep. 30, 2014

(54) ROTOR AND PROCESS FOR PRODUCING THE SAME

(75) Inventor: Robert Filgertshofer, Reichling (DE)

(73) Assignee: Hirschvogel Umformtechnik GmbH, Denklingen (DE)

( * ) Notice: Subject to any disclaimer, the term of this patent is extended or adjusted under 35 U.S.C. 154(b) by 382 days.

(21) Appl. No.: 13/178,630

(22) Filed: Jul. 8, 2011

(65) Prior Publication Data

US 2012/0032552 A1 Feb. 9, 2012

(30) Foreign Application Priority Data

Aug. 6, 2010 (DE) .......................... 10 2010 039 008

(51) Int. Cl.
*H02K 1/28* (2006.01)
*H02K 7/00* (2006.01)
*F16C 3/02* (2006.01)
*F16C 3/00* (2006.01)

(52) U.S. Cl.
CPC .. *H02K 1/28* (2013.01); *F16C 3/02* (2013.01); *F16C 3/00* (2013.01); *H02K 7/003* (2013.01)
USPC ...... 310/216.121; 310/91; 403/273; 403/274; 403/285; 29/597; 29/598

(58) Field of Classification Search
CPC ............ H02K 1/28; H02K 7/003; F16C 3/00; F16C 3/02
USPC ............. 310/216.121, 91; 403/273, 274, 285; 29/597, 598
IPC ..................... H02K 1/28, 7/00; F16C 3/00, 3/02
See application file for complete search history.

(56) References Cited

U.S. PATENT DOCUMENTS

| 2,697,795 | A | * | 12/1954 | Woltanski ...................... 310/410 |
| 2,708,246 | A | * | 5/1955 | Dunn ............................ 310/235 |
| 4,339,873 | A | * | 7/1982 | Kanamaru et al. .............. 29/598 |
| 4,376,333 | A | * | 3/1983 | Kanamaru et al. .............. 29/432 |
| 4,377,762 | A | * | 3/1983 | Tatsumi et al. ................ 310/263 |
| 4,541,315 | A | * | 9/1985 | Kanamaru et al. .............. 82/165 |
| 4,809,429 | A | * | 3/1989 | Martin ............................ 29/736 |
| 4,868,392 | A | * | 9/1989 | Wong ....................... 250/363.03 |
| 6,744,159 | B2 | * | 6/2004 | Droll et al. ................... 310/67 R |

(Continued)

FOREIGN PATENT DOCUMENTS

WO WO 2006136252 A1 * 12/2006

*Primary Examiner* — John K Kim
(74) *Attorney, Agent, or Firm* — Marshall, Gerstein & Borun LLP

(57) ABSTRACT

The invention relates to a rotor that exhibits a rotor shaft, by which a rotor axis is defined, and also a core stack that is arranged around the rotor shaft along a longitudinal portion of the rotor axis. Along the longitudinal portion the rotor shaft exhibits a first surface region, the shape of which describes a circular cylinder, and also a second surface region which is constituted by structural elements that with respect to the rotor axis rise radially outwardly above the first surface region. For the purpose of producing the rotor, the core stack can be pushed over the rotor shaft and in the process can be pushed against the structural elements) in such a manner that it is deformed and by this means a positive connection between the rotor shaft and the core stack is generated. In this way, in particularly simple manner in terms of production engineering a reliable and torsion-proof connection between the core stack and the rotor shaft can be formed.

14 Claims, 4 Drawing Sheets

(56) References Cited

U.S. PATENT DOCUMENTS

| | | | |
|---|---|---|---|
| 6,909,213 B2* | 6/2005 | Frey et al. | 310/77 |
| 8,402,650 B2* | 3/2013 | Mueller | 29/888.1 |
| 2006/0193683 A1* | 8/2006 | Yokoo et al. | 403/256 |
| 2008/0079330 A1* | 4/2008 | Ishida et al. | 310/263 |
| 2008/0315714 A1* | 12/2008 | Badey et al. | 310/261 |
| 2010/0224145 A1* | 9/2010 | Mueller | 123/90.1 |
| 2012/0032552 A1* | 2/2012 | Filgertshofer | 310/216.121 |

* cited by examiner

ROTOR AND PROCESS FOR PRODUCING THE SAME

BACKGROUND OF THE INVENTION

1. Field of the Invention

The invention relates to a rotor with a rotor shaft by which the rotor axis is defined and also with a core stack which is arranged around the rotor shaft along a longitudinal portion of the rotor axis. The invention further relates to a production process for such a rotor.

2. Related Technology

With such a rotor, as a rule it is desirable or required that the core stack is firmly connected to the rotor shaft in such a way that in the course of a normal use of the rotor, for instance as an element of an electric motor, no relative rotation between the core stack and the rotor shaft is able to occur.

For the purpose of producing such a rotor it is known to shrink the core stack onto the rotor shaft. This is, however, comparatively time-consuming and expensive. In particular, this process requires an extensive machining of the rotor shaft prior to the shrinking-on operation.

SUMMARY OF THE INVENTION

The invention provides an appropriate rotor that can be produced more easily, and also a production process for such a rotor.

According to the invention, a rotor is provided that exhibits a rotor shaft, by which a rotor axis is defined, and also a core stack that is arranged around the rotor shaft along a longitudinal portion of the rotor axis. Along the longitudinal portion the rotor shaft exhibits a first surface region, the shape of which describes a circular cylinder, and also a second surface region that is constituted by structural elements that with respect to the rotor axis rise radially outwardly above the first surface region.

For the purpose of producing the rotor, the core stack can be pushed over the rotor shaft and, in the process, pressed against the structural elements in such a manner that the core stack is plastically deformed and by this means a positive connection between the rotor shaft and the core stack is generated. In this way, a reliable and torsion-proof connection between the core stack and the rotor shaft can be formed in particularly simple manner in terms of production engineering. In other words, a positive closure established by reshaping can be generated.

If the structural elements are formed parallel to the rotor axis, in the course of production of the rotor the core stack can be pushed over the rotor shaft without rotation about the rotor shaft: by this means, deformations of the core stack can be generated which are likewise formed correspondingly parallel to the rotor shaft, so that a particularly reliable positive closure is formed.

Preferably the structural elements are designed in such a manner that they extend along the rotor axis over at least one half, preferably at least two thirds, particularly preferably at least three quarters, of the longitudinal portion. In this way a comparatively large-area positive-closure region and consequently a particularly reliable positive closure can be produced.

In a particularly preferably manner, between three and one hundred, highly preferably between five and fifty, structural elements are present which are uniformly arranged over the periphery of the rotor shaft.

It is preferred that the structural elements exhibit a maximal height with respect to the circular cylinder that amounts to between 0.05 mm and 5 mm, highly preferably between 0.1 mm and 2 mm.

Preferably the structural elements exhibit, in a section at right angles to the rotor axis, in each instance a shape that is vaulted outwards. In the course of production this favors a displacement of the material of the core stack that results in a particularly reliable positive connection.

Furthermore, the configuration of the rotor shaft is preferably such that, viewed in a section at right angles to the axis of rotation, those angular regions that are covered by the first surface region are larger, preferably at least one and a half times as large, as those further angular regions which are covered by the second surface region. In this way, ample space can be guaranteed between two adjacent structural elements for receiving displaced material of the core stack, which is again conducive to the stability of the positive connection.

According to a further aspect of the invention, an electric motor is provided that exhibits a rotor according to the invention.

According to yet another aspect of the invention, a process is provided for producing a rotor that exhibits a rotor shaft, by which a rotor axis is defined, and also a core stack that is arranged around the rotor shaft along a longitudinal portion of the rotor axis. The rotor shaft exhibits along the longitudinal portion a first surface region, the shape of which describes a circular cylinder, and also a second surface region that is constituted by structural elements that with respect to the rotor axis rise radially outwardly above the first surface region. For the purpose of connecting the core stack to the rotor shaft, the core stack is pressed against the structural elements in such a manner that by this means the core stack undergoes a deformation.

Preferably the structural elements of the rotor shaft are formed within the scope of the production of the rotor shaft by a reshaping.

Furthermore, within the scope of the production of the core stack the core stack is preferably provided with a bore for receiving the rotor shaft, so that the core stack exhibits a round inside diameter. The bore exhibits a bore radius that is larger by a small measurement than the radius of the circular cylinder, the small measurement being smaller than or equal to the maximal height of the structural elements with respect to the circular cylinder. In this way a particularly suitable space for the deformation of the core stack is available between the structural elements; this contributes towards a particularly reliable connection being capable of being formed between the core stack and the rotor shaft.

The small measurement preferably amounts to between 0.001 mm and 2 mm, highly preferably between 0.01 mm and 1 mm.

The process is preferably a process for producing a rotor according to the invention.

BRIEF DESCRIPTION OF THE DRAWINGS

The invention is described in greater detail in the following on the basis of an exemplary embodiment and with reference to the drawings. Shown are.

DETAILED DESCRIPTION

Figure 9:
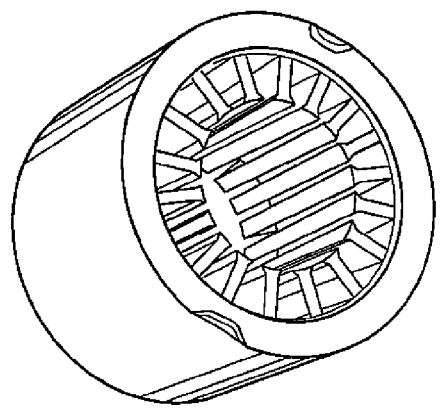
Figure 8:
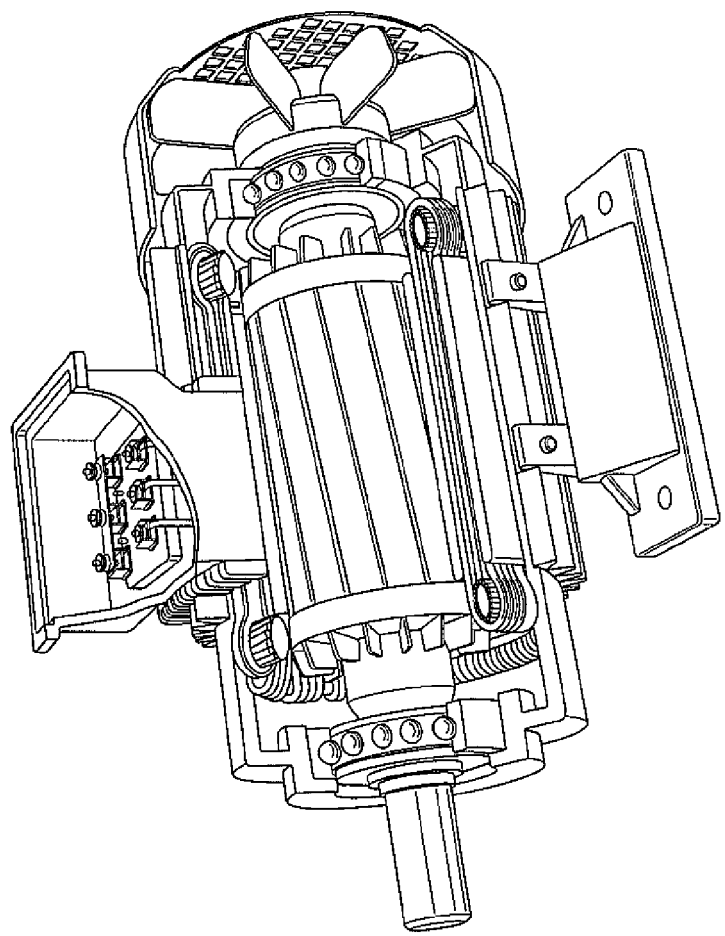

A rotor according to the invention is suitable, for example, as the rotor of an electric motor such as is shown in exemplary manner in FIG. 8 in the form of a stationary asynchronous motor. In FIG. 9 a welded core stack is shown in exemplary manner.

Figure 1:
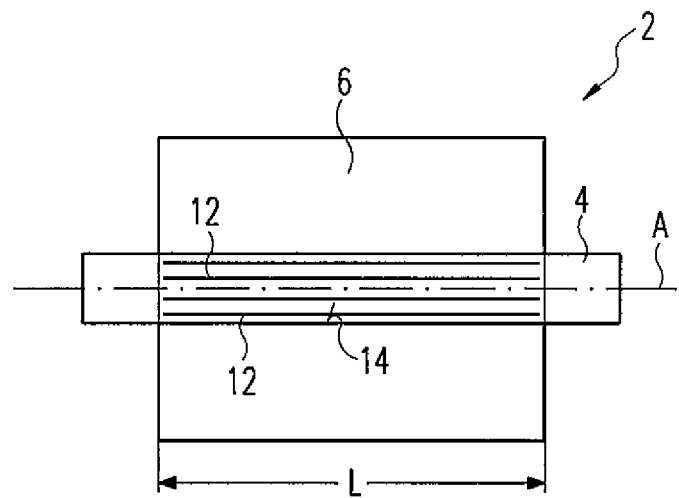
FIG. 1 a schematic cross-sectional sketch of a rotor according to the invention, FIG. 2 the rotor shaft of the rotor sketched in FIG. 1, FIG. 3 a cross-sectional sketch through the rotor shaft, FIG. 4 a detail from FIG. 3 with corresponding portion of the core stack, FIG. 5 a detail of the rotor shaft and of the core stack connected thereto, FIG. 6 an isolated detail of the rotor, FIG. 7 an isolated detail of the core stack, FIG. 8 an example of a stationary asynchronous motor, and FIG. 9 a welded core stack.

FIG. 1 shows, in very schematic form, an embodiment of a rotor 2 according to the invention. The rotor 2 exhibits a rotor shaft 4, which is shown in isolated manner in FIG. 2. A rotor axis A is defined by the rotor shaft 4. The rotor 2 further exhibits a core stack 6 that is arranged around the rotor shaft 4 along a longitudinal portion L of the rotor axis A.

Figure 3:
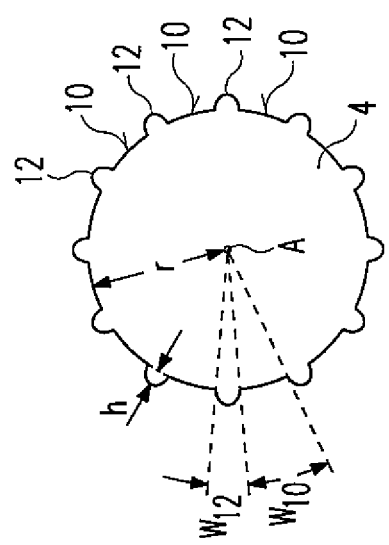

In FIG. 3 a cross-section of the rotor shaft 4 in the region of the longitudinal portion L is sketched. The rotor shaft 4 exhibits within the longitudinal portion L a first surface region 10, the shape of which describes a circular cylinder, and also a second surface region which is constituted by structural elements 12 that with respect to the rotor axis A rise radially outwardly above the first surface region 10. In FIG. 3 the radius of the circular cylinder is denoted by r, and the maximal height of the structural elements 12 with respect to the level of the circular cylinder is denoted by h.

Figure 4:
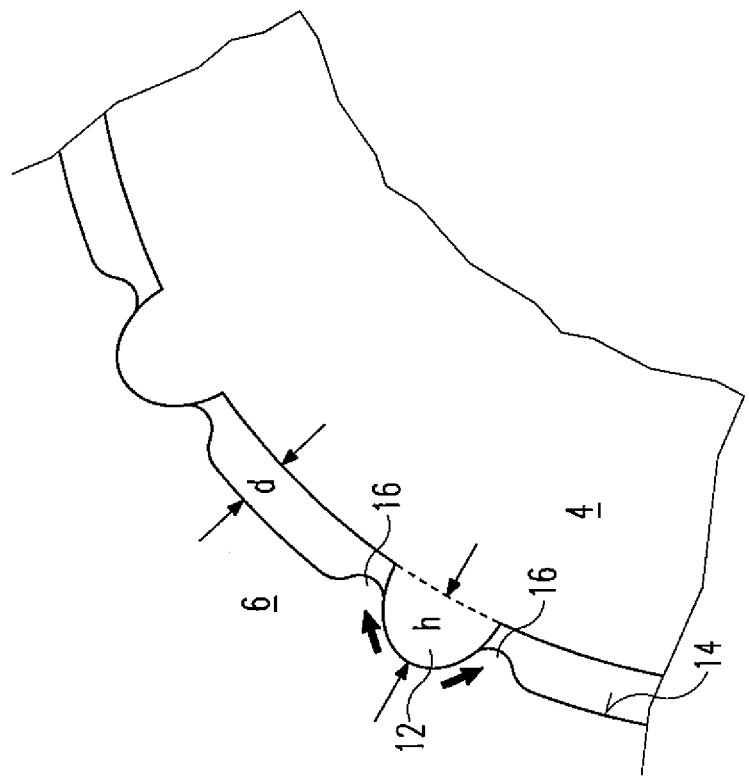

FIG. 4 shows an enlarged detail from FIG. 3, the corresponding part of the core stack 6 also being sketched.

For the purpose of connecting the core stack 6 to the rotor shaft 4, the core stack 6 is pushed or pressed against the structural elements 12 in such a manner that by this means the core stack 6 undergoes a deformation. In particular, for the purpose of producing the rotor 2 the core stack 6 may firstly be provided with a bore 14 for receiving the rotor shaft 4, and in a following step the core stack 6 may be pressed over the rotor shaft 4 by a movement along the rotor axis A until the desired relative arrangement between core stack 6 and rotor shaft 4 has been achieved. In this connection the structural elements 12 may cause regions of the inner wall of the bore 14 that are close to the surface to be deformed by interaction with the structural elements 12, so that as a result a positive connection is generated. In FIG. 4 corresponding accumulations 16 or ramparts caused by displacements of the material or deformations of the core stack 6 are represented schematically.

Preferably in terms of production the structural elements 12 of the rotor shaft 4 are formed within the scope of the production of the rotor shaft 4 by a reshaping.

Figure 7:
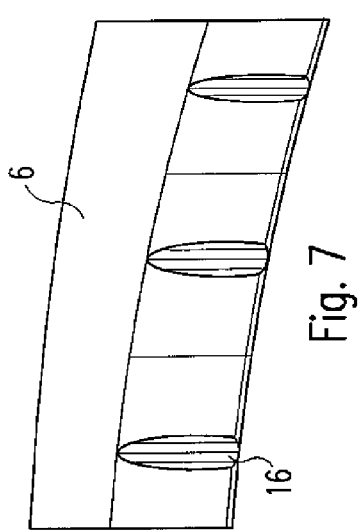
Figure 6:
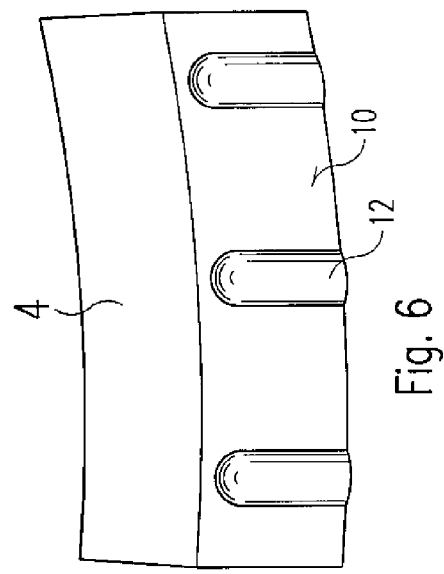
Figure 5:
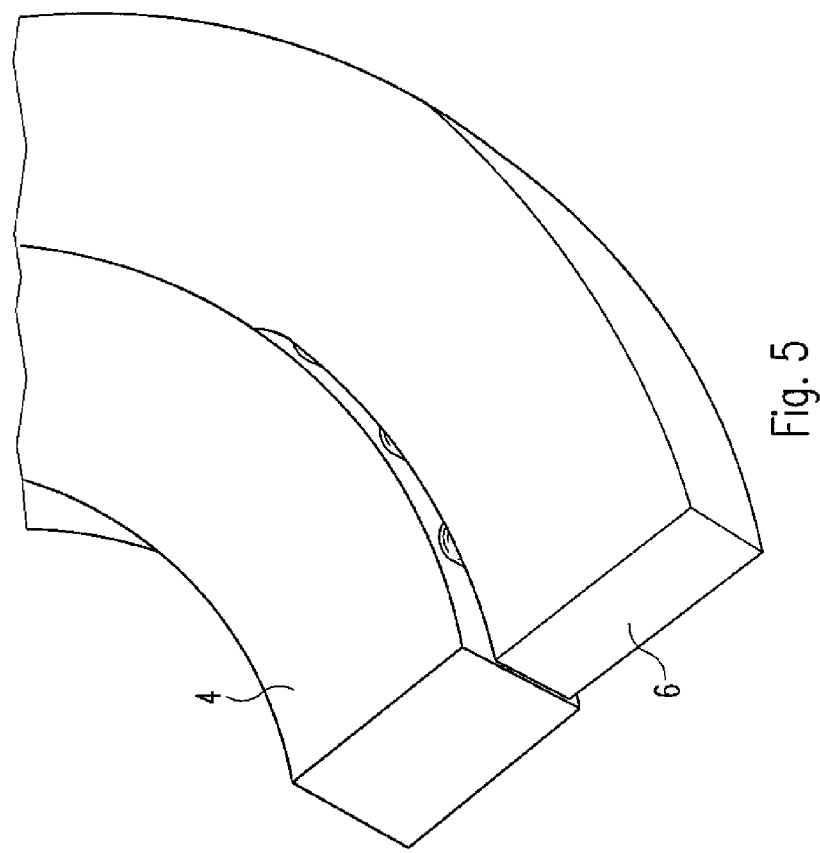

In FIG. 5 a detail of the rotor shaft 4 and of the core stack 6 connected thereto is shown in perspective; in FIG. 6 an isolated detail of the rotor shaft 4 is shown; and in FIG. 7 an isolated detail of the core stack 6 is shown. In FIG. 7 the accumulations 16 can be discerned in suggestive manner.

Figure 2:
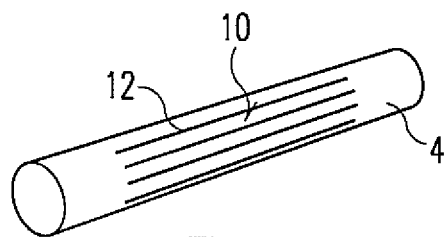

As sketched in exemplary manner in FIGS. 1 and 2, the invention may provide that the structural elements 12 are formed parallel to the rotor axis A. By this means a rectilinear pushing of the core stack 6 onto the rotor shaft 4, without rotation, is made possible. In this connection it is possible for accumulations 16, which are likewise correspondingly of linear design to be formed, so that overall a particularly effective positive closure can arise.

The invention may provide that the structural elements 12 are formed in such a manner that they extend along the rotor axis A over at least one half, preferably at least two thirds, particularly preferably at least three quarters, of the longitudinal portion L, for instance over at least 80% or 90% of the longitudinal portion L. The longer the structural elements 12 are, the longer are the accumulations 16 that can be achieved; in turn, with increasing length of the accumulations 16 an increasingly more stable positive connection can be brought about in principle.

In particular, the invention may provide that the structural elements 12 exhibit the same cross-section over their entire extent along the rotor axis A. This is advantageous in terms of production. For instance, the invention may provide that the rotor axis 4 exhibits a uniform cross-section over at least 80% or 90% of the longitudinal portion L.

For example, a total of between three and one hundred, preferably between five and fifty, structural elements 12 may be present which are uniformly arranged over the periphery of the rotor shaft 4. Furthermore, it has proved advantageous if the structural elements 12 exhibit a maximal height h with respect to the circular cylinder that amounts to between 0.05 mm and 5 mm, preferably between 0.1 mm and 2 mm.

Preferably with respect to the displacement of the material of the core stack 6, the structural elements 12 exhibit, viewed in a section at right angles to the rotor axis A, in each instance a shape that is vaulted outwardly; in particular, the invention may provide that each of the structural elements 12 exhibits no edge and preferably exclusively a roundness that is vaulted outwardly. The structural elements 12 may accordingly be provided in the form of 'bumps.' By this means, the displacement of the material of the core stack 6, viewed in cross-section, is assisted on the two sides of a corresponding structural element 12; this displacement of material is indicated in FIG. 4 by the two small arrows drawn in bold.

The structural elements 12 can also be shaped without any edge, viewed in longitudinal section. By this means, in particular a 'run-up slope' for inserting the rotor shaft 4 into the bore 14 can be formed.

The invention may provide that the structural elements 12 or bumps exhibit, viewed in cross-section, a height that increases, starting from an end region. Furthermore, it is possible that the rotor is designed in such a manner that the number of structural elements 12 or bumps increases, viewed over a longitudinal region of the longitudinal axis. By this means, a facilitated pressing-on of the core stack 6 can be achieved.

For the purpose of production, the invention may provide that the core stack 6 is provided with the bore 14 for receiving the rotor shaft 4, the bore exhibiting a bore radius that is somewhat larger than the radius r of the circular cylinder. In this way a suitably dimensioned space for the formation of the accumulations 16 can be ensured. Preferably in this connection the bore radius is a small measurement d larger than the radius r of the circular cylinder, the small measurement d being equal to or preferably smaller than the maximum height h of the structural elements 12 with respect to the circular cylinder. For example, the following relationship may be envisaged: $h/3 < d < 2h/3$. Regarded in absolute terms, d may amount, for example, to between 0.001 mm and 2 mm, preferably between 0.01 mm and 1 mm.

Furthermore, the configuration of the rotor shaft 4 may be such that, viewed in a section at right angles to the axis of rotation A, those angular regions that are covered by the first surface region 10 are larger, preferably at least one and a half times as large, as those further angular regions which are covered by the second surface region. This will be clarified in exemplary manner on the basis of FIG. 3. Therein, that angular region which is covered by a part of the first surface region 10 is denoted by $w_{10}$, and that angular region which is covered by a structural element 12 adjacent thereto is denoted by $w_{12}$. By reason of the design, which is symmetrical over the periphery, it follows that, in the example shown, the ratio of those angular regions which are covered by the first surface region 10 to those angular regions which are covered by the second surface region is equal to $w_{10}/w_{12}$, that is to say, according to the drawing this ratio is greater than 1. As is again clearly evident from FIG. 4, by virtue of this design it can be guaranteed that sufficient space is reliably created for the formation of the accumulations 16, by virtue of which the stability of the positive connection is again assisted.

Lastly, in accordance with the invention an electric motor is provided with a rotor according to the invention.

The rotor according to the invention can be produced particularly easily, that is to say, with particularly low production and manufacturing costs, and nevertheless at the same time offers a reliable torsion-resistant connection between the rotor shaft and the core stack. The connection is ensured by a positive closure generated by reshaping.

The invention claimed is:

1. A rotor comprising a rotor shaft defining a rotor axis and a core stack arranged around the rotor shaft along a longitudinal portion of the rotor axis, wherein the rotor shaft defines a first surface region along the longitudinal portion, the first surface region defining a shape of a circular cylinder having a radius r, and a second surface region constituted by structural elements that with respect to the rotor axis rise radially outwardly above the first surface region, wherein the structural elements exhibit a maximal height h with respect to the circular cylinder, and the core stack is provided with a bore for receiving the rotor shaft, wherein the bore exhibits a bore radius that is larger by a small measurement d than the radius r of the circular cylinder, wherein $h/3<d<2h/3$ and the structural elements extend along the rotor axis over at least one half of the longitudinal portion, wherein when viewed in a section at right angles to the axis of rotation, angular regions that are covered by the first surface region are larger than angular regions that are covered by the second surface region, and when viewed in a section at right angles to the axis of rotation, the angular regions that are covered by the first surface region are at least one and a half times as large as the angular regions that are covered by the second surface region.

2. A rotor according to claim 1, wherein the structural elements are formed parallel to the rotor axis.

3. A rotor according to claim 1, wherein the structural elements are formed in such a manner that they extend along the rotor axis over at least one half of the longitudinal portion.

4. A rotor according to claim 3, wherein the structural elements are formed in such a manner that they extend along the rotor axis over at least two thirds of the longitudinal portion.

5. A rotor according to claim 3, wherein the structural elements are formed in such a manner that they extend along the rotor axis over at least three quarters of the longitudinal portion.

6. A rotor according to claim 1, wherein between three and one hundred structural elements are uniformly arranged over the periphery of the rotor shaft.

7. A rotor according to claim 6, wherein between five and fifty structural elements are uniformly arranged over the periphery of the rotor shaft.

8. A rotor according to claim 1, wherein the structural elements exhibit a maximal height h with respect to the circular cylinder that amounts to between 0.05 mm and 5 mm.

9. A rotor according to claim 8, wherein the structural elements exhibit a maximal height h with respect to the circular cylinder that amounts to between 0.1 mm and 2 mm.

10. A rotor according to claim 1, wherein the structural elements exhibit, in a section at right angles to the rotor axis, in each instance a shape that is vaulted outwardly.

11. A rotor according to claim 1, wherein, viewed in a section at right angles to the axis of rotation, those angular regions that are covered by the first surface region are larger than those further angular regions that are covered by the second surface region.

12. A rotor according to claim 11, wherein, viewed in a section at right angles to the axis of rotation, those angular regions that are covered by the first surface region are at least one and a half times as large as those further angular regions that are covered by the second surface region.

13. A rotor according to claim 1, wherein each of the structural elements exhibits, viewed in a section at right angles to the rotor axis, no edge and exclusively a roundness that is vaulted outwardly.

14. An electric motor comprising a rotor, the rotor comprising a rotor shaft defining a rotor axis and a core stack arranged around the rotor shaft along a longitudinal portion of the rotor axis, wherein the rotor shaft defines a first surface region along the longitudinal portion, the first surface region defining a shape of a circular cylinder having a radius r, and a second surface region constituted by structural elements that with respect to the rotor axis rise radially outwardly above the first surface region, wherein the structural elements exhibit a maximal height h with respect to the circular cylinder, and the core stack is provided with a bore for receiving the rotor shaft, wherein the bore exhibits a bore radius that is larger by a small measurement d than the radius r of the circular cylinder, wherein $h/3<d<2h/3$ and the structural elements extend along the rotor axis over at least one half of the longitudinal portion, wherein when viewed in a section at right angles to the axis of rotation, angular regions that are covered by the first surface region are larger than angular regions that are covered by the second surface region, and when viewed in a section at right angles to the axis of rotation, the angular regions that are covered by the first surface region are at least one and a half times as large as the angular regions that are covered by the second surface region.

* * * * *